United States Patent

Fujita et al.

[11] Patent Number: 6,048,931
[45] Date of Patent: Apr. 11, 2000

[54] POLYCARBONATE RESIN COMPOSITION

[75] Inventors: Katsutoyo Fujita, Kawanishi; Yoshitaka Ono, Settsu, both of Japan

[73] Assignee: Kaneka Corporation, Osaka, Japan

[21] Appl. No.: 09/068,119

[22] PCT Filed: Nov. 7, 1996

[86] PCT No.: PCT/JP96/03291

§ 371 Date: May 6, 1998

§ 102(e) Date: May 6, 1998

[87] PCT Pub. No.: WO97/17404

PCT Pub. Date: May 15, 1997

[30] Foreign Application Priority Data

Nov. 9, 1995 [JP] Japan ..................................... 7-317494
Aug. 20, 1996 [JP] Japan ..................................... 8-218527

[51] Int. Cl.[7] .............................. C08L 69/00; C08L 67/02
[52] U.S. Cl. ............................ 525/67; 525/133; 525/148; 528/283
[58] Field of Search ............................ 525/67, 133, 148; 528/283

[56] References Cited

U.S. PATENT DOCUMENTS

| | | |
|---|---|---|
| 3,651,017 | 3/1972 | Tanabe . |
| 4,629,760 | 12/1986 | Liu . |
| 4,639,481 | 1/1987 | Giles . |
| 4,778,853 | 10/1988 | Belfoure . |
| 5,013,793 | 5/1991 | Wang . |
| 5,591,803 | 1/1997 | Sullivan . |

FOREIGN PATENT DOCUMENTS

| | | |
|---|---|---|
| 102043 | 9/1976 | Japan . |
| 62-177058 | 8/1987 | Japan . |
| 62-265344 | 11/1987 | Japan . |
| 2-167355 | 6/1990 | Japan . |
| 224218 | 8/1995 | Japan . |

*Primary Examiner*—David Buttner
*Attorney, Agent, or Firm*—Armstrong, Westerman, Hattori, McLeland & Naughton

[57] ABSTRACT

Polycarbonate resin compositions comprising (A) a composition comprising a polycarbonate resin (A-1) and a specific polyethylene terephthalate resin polymerized by using a germanium catalyst (A-2) in an (A-1)/(A-2) ratio of 99/1 to 40/60 by weight, (B) 1 to 10 parts by weight, per 100 parts by weight of the composition (A), of an olefin-alkyl (meth) acrylate copolymer having an MI of 0.1 to 300 g/10 minutes and optionally (C) 2 to 10 parts by weight, per 100 parts by weight of the composition (A), of a graft copolymer in which at least one monomer selected from an aromatic vinyl compound, a vinyl cyanide compound, an acrylic acid ester, a methacrylic acid ester and vinyl compounds copolymerizable therewith is copolymerized with a rubbery elastomer. The polycarbonate resin compositions can meet recent demand of high level solvent resistance and also have excellent heat stability and flow property in molding.

2 Claims, 1 Drawing Sheet

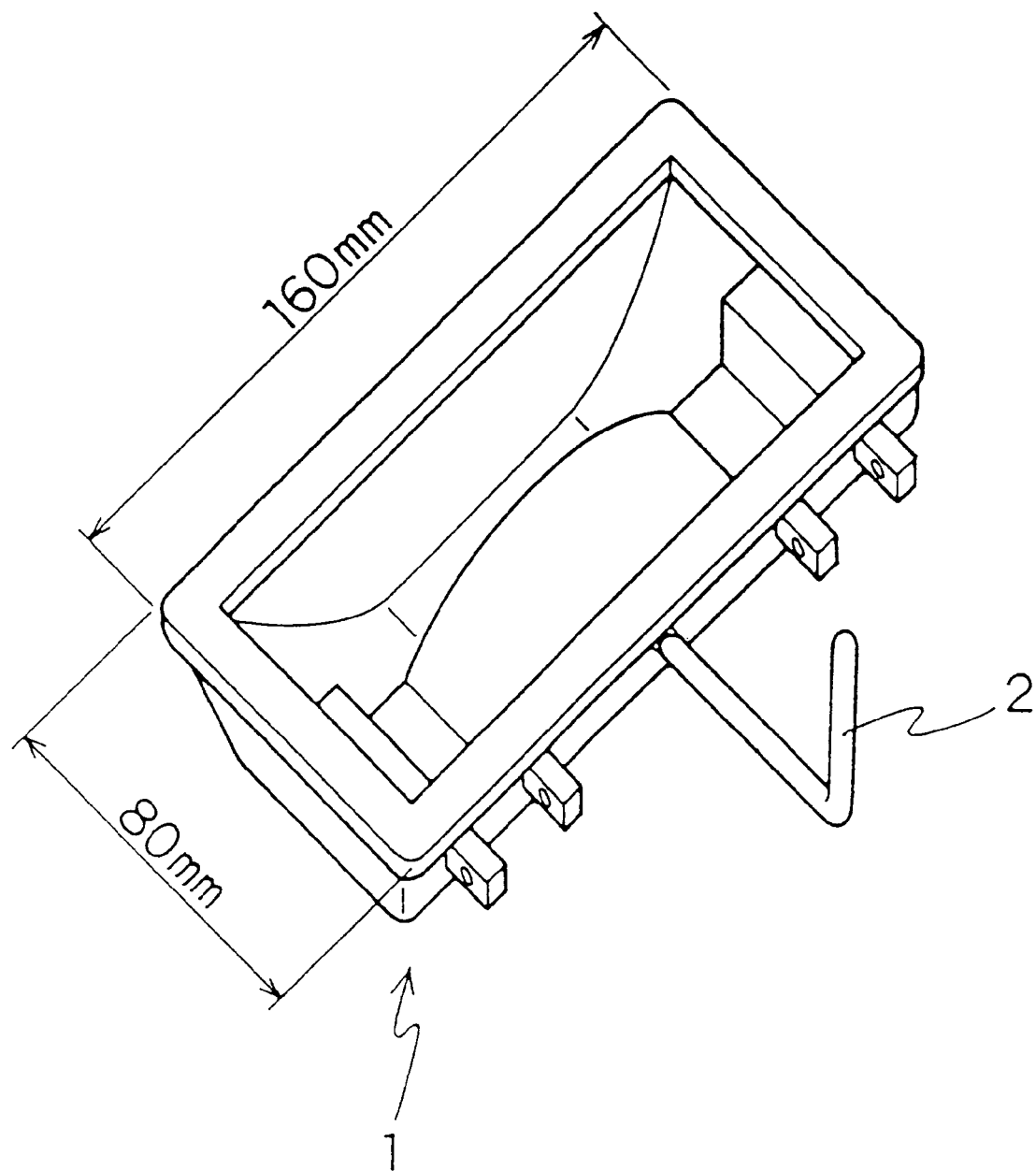
F I G. 1

POLYCARBONATE RESIN COMPOSITION

TECHNICAL FIELD

The present invention relates to a polycarbonate resin composition and more particularly to a novel polycarbonate resin composition which exhibits excellent solvent-resistance, heat stability and flow property in molding processing.

BACKGROUND ART

Polycarbonate resin is known as a resin which has the best impact resistance among engineering plastics and a good heat distortion resistance, and by making use of these advantages, it has been applied to various fields.

However, polycarbonate resin has disadvantages such as poor solvent-resistance and flow property in molding processing. For example, if polycarbonate resin comes into contact with various organic solvents, gasoline or the like, cracking may happen in the surface of its molded articles, or the molded articles may be dissolved Particularly, when forming aromatic polycarbonate resins by injection molding or the like, relatively high injection speed and pressure are required. Consequently, some strain may remain in the molded articles by which serious cracks generate in this strained portion Moreover, in addition to the resistance against gasoline, engine oil or the like which has hitherto been required, a resistance against mixed solvents (e.g. wax remover) has become to be further required.

On the other hand, polyethylene terephthalate resin has excellent solvent-resistance and flow property in molding.

Accordingly, for the purpose of improving the disadvantages of polycarbonate resin, various resin compositions have been studied and reported. For example, Japanese Examined Patent Publication No. 36-14035, Japanese Examined Patent Publication No. 39-20434, Japanese Unexamined Patent Publication No. 59-176345, Japanese Examined Patent Publication No. 5-87540, Japanese Unexamined Patent Publication No. 3-140359 and Japanese Unexamined Patent Publication No. 4-85360 propose resin compositions composed of a polycarbonate resin and a polyester resin and those to which a polyolefin or a rubber component is further added, and disclose that some improvement of solvent-resistance is obtained.

Also, in Japanese Examined Patent Publication No. 58-13588, Japanese Unexamined Patent Publication No. 62-48760 and Japanese Unexamined Patent Publication No. 62-48761, it is disclosed that by blending a polycarbonate resin, a polyester resin and an ethylene-ethyl acrylate copolymer in a specific ratio, resin compositions having excellent moldability, heat stability, impact resistance and heat resistance are obtained.

Recently, by the reason that cost reduction has been strongly demanded in various applied fields of polycarbonate resin, abolition of plating, coating and the like has been studied as for the molded articles used as automobile exterior materials. The plating or coating of the molded articles has been made not only for the better appearance but also for forming a protective film Therefore, omission of plating or coating results in direct contact of the molded articles with solvents. Accordingly, the required level of solvent-resistance now has become much higher than that of before.

Also, reduction of the number of component parts is required for the cost reduction Consequently, the component parts are united to one unit and incidentally the shape becomes more complicated and bigger. A better molding processability adaptable to formation of such shaped articles, in other words, both a better heat stability and a better flow property in molding, have become to be required.

However, in the case of only using the above-mentioned resin compositions composed of polycarbonate resin and polyester resin or those further containing polyolefin or rubbery component, the solvent-resistance does not reach a level which enables to use as a material for automobile exterior parts without coating or plating, and also, the heat stability and flow property in molding are not so high as to meet the use for recent automobile exterior parts.

The above-mentioned compositions composed of polycarbonate resin, polyester resin and ethylene-ethyl acrylate copolymer are also not sufficient for a recent high level requirement of solvent-resistance. So further improvement is desired.

As aforementioned, in prior art, polycarbonate resin compositions having an excellent solvent-resistance which is applicable to automobile exterior use without coating or plating, and having excellent flow property in molding and heat stability which are adaptable to molding into more complicated and bigger shapes, have not been obtained yet.

DISCLOSURE OF THE INVENTION

The present inventors made intensive studies to solve problems as mentioned above and, as a result, they have found that by adding a specific olefin-alkyl (meth)acrylate copolymer to a composition containing a polycarbonate resin and a polyethylene terephthalate resin having not less than 80% by mole of ethylene terephthalate repeating units which has been polymerized by using a germanium catalyst, in a specific ratio, a polycarbonate resin composition having excellent solvent-resistance, heat stability and flow property in molding can be obtained, and in addition, when a specific graft copolymer is further added to the composition, the impact resistance at low temperatures can be improved. Thus, they have accomplished the present invention.

The present invention relates to:

a polycarbonate resin composition (I) comprising (A) 100 parts (parts by weight, hereinafter the same) of a composition comprising a polycarbonate resin (A-1) and a polyethylene terephthalate resin (A-2) polymerized by using a germanium catalyst and having not less than 80% by mole of ethylene terephthalate repeating units, wherein the weight ratio of (A-1)/(A-2) is from 99/1 to 40/60, and (B) 1 to 10 parts, per 100 parts of said composition (A), of a copolymer which has units of at least one olefin and units of at least one (meth)acrylic acid alkyl ester with an alkyl group having 1 to 10 carbon atoms and whose melt index (MI) is from 0.1 to 300 g/10 minutes under the conditions of 190° C. and 2 kg load (based on JIS K 6730) (the copolymer being hereinafter referred to as "olefin-alkyl (meth)acrylate copolymer (B)" or "copolymer (B)"), and a polycarbonate resin composition (II) comprising (A) a composition comprising a polycarbonate resin (A-1) and a polyethylene terephthalate resin (A-2) polymerized by using a germanium catalyst and having not less than 80% by mole of ethylene terephthalate repeating units wherein the weight ratio of (A-1)/(A-2) is from 99/1 to 40/60, (B) 1 to 10 parts, per 100 parts of said composition (A), of a copolymer which has units of at least one olefin and units of at least one (meth)acrylic acid alkyl ester with an alkyl group having 1 to 10 carbon atoms and whose melt index (MI) is from 0.1 to 300 g/10 minutes under the conditions of 190° C. and 2 kg load (based on JIS K 6730), and (C) 2 to 10 parts, per 100 parts of said composition (A), of a graft copolymer in which at least one monomer selected from an aromatic vinyl compound, a vinyl cyanide compound, an acrylic acid ester, a methacrylic acid ester and other vinyl compounds copolymerizable with these compounds are copolymerized with a rubbery elastomer.

BRIEF DESCRIPTION OF DRAWING

FIG. 1 is an explanatory view which schematically shows an outer frame component of an automobile door handle used in the heat stability test made in examples or the like of the present invention.

BEST MODE FOR CARRYING OUT THE INVENTION

Polycarbonate resin (A-1) used in the present invention is a thermoplastic resin obtained by reacting a phenolic compound having a valency of at least 2 with phosgene or a carbonic acid ester such as diphenyl carbonate, and is a a component used to impart properties such as impact resistance, heat distortion resistance, mechanical strength and the like to the resin composition of the present invention.

There are various kinds of the phenol compounds having a valency of at least 2. In particular, 2,2-bis(4-hydroxyphenyl)propane (common name: bisphenol A) which is a dihydric phenol compound is preferred from the viewpoints of economy and good mechanical strength Examples of the dihydric phenol compounds other than bisphenol A are, for instance, dihydroxydiarylalkanes such as bis(4-hydroxyphenyl)methane, bis(4-hydroxyphenyl)-phenylmethane, bis(4-hydroxyphenyl)naphthylmethane, bis (4-hydroxyphenyl)(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-, 1,1-bis(4-hydroxyphenyl)ethane, 1, 2-bis(4-hydroxyphenyl)-ethane, 2-methyl-1,1-bis(4-hydroxyphenyl)propane, 2,2-bis (3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl) propane, 1,1-bis(4-hydroxyphenyl)-butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)-decane, 1, 1-bis(4-hydroxyphenyl)-3,3,5-trimethylcyclohexane and 2,2-bis(4-hydroxyphenyl)-1,1,1,3,3,3-hexafluoropropane; dihydroxydiarylcycloalkanes such as 1,1-bis(4-hydroxyphenyl)cyclohexane, 1,1-bis(3,5-dichloro-4-hydroxyphenyl)cyclohexane and 1,1-bis(4-hydroxyphenyl)cyclodecane; dihydroxydiarylsulfones such as bis(4-hydroxyphenyl)sulfone, bis(3,5-dimethyl-4-hydroxyphenyl)sulfone and bis(3-chloro-4-hydroxyphenyl) sulfone; dihydroxydiaryl ethers such as bis(4-hydroxyphenyl)ether and bis(3,5-dimethyl-4-hydroxyphenyl)ether; dihydroxydiaryl ketones such as 4,4'-dihydroxybenzophenone and 3,3',5,5'-tetramethyl-4,4'-dihydroxybenzophenone; dihydroxydiarylsulfides such as bis(4-hydroxyphenyl)sulfide, bis(3-methyl-4-hydroxyphenyl)sulfide and bis(3,5-dimethyl-4-hydroxyphenyl)sulfide; dihydroxydiarylsulfoxides such as bis(4-hydroxyphenyl)sulfoxide; dihydroxydiphenyls such as 4,4'-dihydroxydiphenyl; dihydroxyarylfluorenes such as 9,9-bis(4-hydroxyphenyl)fluorene; and the like In addition to the above-mentioned dihydric phenol compounds, other dihydric phenol compounds, e.g., dihydroxybenzenes such as hydroquinone, resorcinol and methylhydroquinone; and dihydroxynaphthalenes such as 1,5-dihydroxynaphthalene and 2,6-dihydroxynaphthalene, can also be mentioned Further, phenolic compounds having a valency of 3 or more can be used as long as the obtained polycarbonate resin (A-1) keeps its thermoplasticity. Examples of the tri or more hydric phenol compounds are, 2,4,4'-trihydroxybenzophenone, 2,2,4,4'-tetrahydroxybenzophenone, 2,4,4'-trihydroxyphenylether, 2,2',4,4'-tetrahydroxyphenylether, 2,4,4-trihydroxydiphenyl-2-propane, 2,2-bis(2,4-dihydroxy) propane, 2,2',4,4'-tetrahydroxydiphenylmethane, 2,4,4'-trihydroxydiphenylmethane, 1-[α-methyl-α-(4'-dihydroxyphenyl)ethyl]-3-[α', α-bis(4'-hydroxyphenyl) ethyl]benzene, 1-[α-methyl-α-(4'-dihydroxyphenyl)ethyl]-4-[α', α'-bis(4"-hydroxyphenyl)ethyl]benzene, α, α', α"-tris (4-hydroxyphenyl)- 1,3,5-triisopropylbenzene, 2,6-bis(2-hydroxy-5'-methylbenzyl)-4-methylphenol, 4,6-dimethyl-2, 4,6-tris-(4'-hydroxyphenyl)-2-heptene, 4,6-dimethyl-2,4,6-tris(4-hydroxyphenyl)-2-heptane, 1,3,5-tris(4-hydroxyphenyl)-benzene, 1,1,1-tris(4-hydroxyphenyl) ethane, 2, 2-bis-[4,4-bis(4'-hydroxyphenyl)cyclohexyl] propane, 2,6-bis(2 -hydroxy-5-isopropylbenzyl)-4-isopropylphenol, bis[2-hydroxy-3-(2 -hydroxy-5'-methylbenzyl)-5-methylphenyl]-methane, bis[2-hydroxy-3-(2'-hydroxy-5'-isopropylbenzyl)-5-methylphenyl]methane, tetrakis(4-hydroxyphenyl)methane, tris(4-hydroxyphenyl) phenylmethane, 2',4',7-trihydroxyflavan, 2,4,4-trimethyl-2', 4',7trihydroxyflavan, 1,3-bis-(2',4'-dihydroxyphenylisopropyl)benzene, tris(4'-hydroxyphenyl)-amyl-s-triazine, and the like.

These di- or more hydric phenol compounds can be used alone or in admixture thereof.

Polycarbonate resin (A-1) may contain a component for providing branched polycarbonate resins besides tri or more hydric phenol compounds, as occasion demands, so long as the solvent-resistance, heat stability and mechanical property are not impaired. Examples of such a component (branching agent) other than the tri or more hydric phenol compounds, which are used to obtain the branched polycarbonate resins are, for instance, phloroglucin, mellitic acid, trimellitic acid, trimellityl chloride, trimellitic anhydride, gallic acid, n-propyl gallate, protocatechuic acid, pyromellitic acid, pyromellitic acid dianhydride, α-resorcylic acid, β-resorcylic acid, resorcylaldehyde, trimethyl chloride, isatinbis(o-cresol), trimethyl trichloride, 4-chloroformylphthalic anhydride, benzophenonetetracarboxylic acid, and the like.

Also, a polycarbonate-polyorganosiloxane copolymer composed of a polycarbonate part and a polyorganosiloxane part can be used as the polycarbonate resin (A-1). The degree of polymerization of this polyorganosiloxane part is preferably not less than five.

In addition, it is also possible to use, as the polycarbonate resin (A-1), for example, a copolymer prepared using a linear aliphatic dicarboxylic acid such as adipic acid, pimelic acid, suberic acid, azelaic acid, sebacic acid or decanedicarboxylic acid as a comonomer.

Also, as a component of polycarbonate resin (A-1), various known terminating agent which has been used in polymerization can be used, as occasion demands, so long as the solvent-resistance, heat stability and mechanical property are not impaired. As specific examples, monohydric phenol compounds such as phenol, p-cresol, p-t-butylphenol, p-t-octylphenol, p-cumylphenol, bromophenol, tribromophenol, nonylphenol and the like can be mentioned.

Examples of the above-mentioned carbonic acid diester are a diaryl carbonate such as diphenyl carbonate, and a dialkyl carbonate such as dimethyl carbonate or diethyl carbonate.

Viscosity average molecular weight of the polycarbonate resin (A-1) is not particularly limited, but from the viewpoint of strength of the obtained resin, it is preferably not less than 10,000, more preferably not less than 12,000, most preferably not less than 13,000. Also, from the viewpoint of molding processability, the viscosity average molecular weight is preferably not more than 60,000, more preferably not more than 50,000, most preferably not more than 40,000.

Typical examples of the polycarbonate resin (A-1) as mentioned above are, for instance, a polycarbonate resin obtained by reaction of bisphenol A and diphenyl carbonate, a polycarbonate resin obtained by reaction of bis(4-hydroxyphenyl)methane and diphenyl carbonate, and the like.

Polyethylene terephthalate resin (A-2) used in the present invention which has been polymerized by using a germanium catalyst and has not less than 80% by mole of ethylene terephthalate repeating units is a polymer having, as a main constituent component (not less than 80% by mole), units of ethylene terephthalate obtained by using terephthalic acid or its derivatives capable of forming esters as the acid component, and ethylene glycol or its derivatives capable of forming esters as the glycol component. The component (A-2) is used to impart properties such as solvent-resistance, flow property in molding to the resin composition of the present invention Since polyethylene terephthalate resin (A-2) is produced by using a germanium catalyst, excellent solvent-resistance and heat stability can be given to the resin composition of the present invention. Also, because of containing at least 80% by mole of ethylene terephthalate repeating units, an excellent flow property in molding can be obtained without deteriorating desirable properties such as heat stability and solvent-resistance that polyethylene terephthalate has.

Polyethylene terephthalate resin (A-2) has preferably an intrinsic viscosity (IV) of 0.45 to 1.20 dl/g, more preferably 0.55 to 0.95 dl/g, measured at 25° C. in a mixed solvent of phenol/tetrachloroethane=1/1 (weight ratio). When the intrinsic viscosity (IV) is less than 0.45 dl/g, the heat resistance may be lowered or the effect of improving the heat stability may not be sufficiently obtained. When exceeding 1.20 dl/g, an excellent effect of improving the flow property in molding may not be obtained.

Examples of a component which can be copolymerized in the polyethylene terephthalate resin (A-2) in an amount of not more than 20% by mole, are a polycarboxylic acid such as a bivalent or more valent aromatic carboxylic acid having 8 to 22 carbon atoms excepting terephthalic acid, a bivalent or more valent aliphatic carboxylic acid having 4 to 12 carbon atoms or a bivalent or more valent alicyclic carboxylic acid having 8 to 15 carbon atoms, ester-formable derivatives of these polycarboxylic acids, a compound having at least two hydroxyl groups in the molecule such as an aliphatic compound having 3 to 15 carbon atoms, an alicyclic compound having 6 to 20 carbon atoms or an aromatic compound having 6 to 40 carbon atoms, ester-formable derivatives of these at least two hydroxyl group-containing compounds, and the like.

Examples of the above-mentioned polycarboxylic acid are, for instance, isophthalic acid, naphthalene-dicarboxylic acid, bis(p-carboxyphenyl)methane, anthracenedicarboxylic acid, diphenyl-4,4'-dicarboxylic acid, 1,2-bis(phenoxy) ethane-4,4'-dicarboxylic acid, adipic acid, sebacic acid, azelaic acid, dodecanedionic acid, maleic acid, trimesic acid, trimellitic acid, pyromellitic acid, 1,3-cyclohexanedicarboxylic acid, 1,4-cyclohexanedicarboxylic acid, decahydronaphthalene dicarboxylic acid and other carboxylic acids, and their derivatives capable of forming esters.

Examples of the above-mentioned compound having at least two hydroxyl groups are, for instance, propylene glycol, butanediol, hexanediol, decanediol, neopentyl glycol, cyclohexanedimethanol, cyclohexanediol, 2,2-bis(4-hydroxyphenyl)propane, 2,2-bis(4-hydroxycyclohexyl) propane, hydroquinone, glycerin, pentaerythritol and others, and their derivatives capable of forming esters.

Also, oxy-acids such as p-hydroxybenzoic acid or p-hydroxybenzoic acid, their derivatives capable of forming esters, and cyclic esters such as ε-caprolactone can be used. With respect to the repeating unit of these compounds, a unit formed from one molecule constitutes one repeating unit.

Further, there can be used a polymer wherein a polyalkylene glycol segment such as polyethylene glycol, polypropylene glycol, poly(ethylene oxide-propylene oxide) block and/or random copolymer, polyethylene oxide bisphenol A ether, polypropylene oxide bisphenol A ether, polytetrahydrofuran bisphenol A ether or polytetramethylene glycol is partly copolymerized in the polymer chain.

The proportion of the above-mentioned components which can be copolymerized is not more than about 20% by mole, and this amount is approximately not more than 20% (% by weight, hereinafter the same), preferably not more than 15%, more preferably not more than 10%.

Examples of the germanium compound used as the polymerization catalyst for the polyethylene terephthalate resin (A-2) are germanium oxides such as germanium dioxide, germanium alkoxides such as germanium tetraethoxide and germanium tetraisopropoxide, germanium hydroxide or its alkali metal salts, germanium glycolate, germanium chloride, germanium acetate, and the like. These compounds may be used alone or in admixture thereof. Among these compounds, germanium dioxide is preferable from the viewpoint of solvent-resistance and heat stability.

As known polymerization catalysts for polyethylene terephthalate resins are mentioned an antimony compound, a tin compound and a titanium compound, but if polymerization catalysts other than the germanium compound, the effect of improving the solvent-resistance and heat stability of the obtained resin composition is not sufficiently obtained.

Polyethylene terephthalate resins (A-2) may be used alone or in admixture of the two or more resins having different copolymerization components and/or intrinsic viscosity.

The amount of the germanium compound used in the polymerization is preferably 0.005 to 0.1%, more preferably 0.007 to 0.05%, most preferably 0.01 to 0.05%, based on the polyethylene terephthalate resin (A-2). If the amount is less than 0.005%, the progress of the polymerization reaction is too slow. If exceeding 0.1%, side reactions may occur owing to the remaining germanium compound in the resin. The germanium compound may be added at any time before starting the polymerization reaction.

The method for producing the polyethylene terephthalate resin (A-2) is not particularly limited with the exception of the use of the specific catalyst, and generally known methods such as melt condensation polymerization method and solid phase polymerization method can be used.

Typical examples of the polyethylene terephthalate resin are polyethylene terephthalate, a copolymer of polyethylene terephthalate with polyethylene glycol, a copolymer of polyethylene terephthalate with polypropylene glycol, a copolymer of polyethylene terephthalate with polyethylene oxide bisphenol A ether, a copolymer of polyethylene terephthalate with polytetrahydrofuran bisphenol A ether, and the like.

The weight ratio of polycarbonate resin (A-1)/polyethylene terephthalate resin (A-2) is from 99/1 to 40/60, preferably 90/10 to 50/50, more preferably 85/15 to 55/45. If the ratio is less than 40/60, the heat resistance of the obtained molded articles is deteriorated, and if exceeding 99/1, the solvent-resistance and flow property in molding are deteriorated.

Olefin-alkyl (meth)acrylate copolymer (B) used in the present invention is generally obtained by radical polymerization of at least one olefin and at least one alkyl (meth) acrylate in the presence of a radical initiator. However, the polymerization method is not limited to this, and various generally known polymerization methods can be used The copolymer can be any type such as random copolymer, block copolymer, graft copolymer or the like.

The olefin constituting the olefin units of such a copolymer is preferably ethylene or an $\alpha$-olefin, examples of which are ethylene, propylene, 1-butene, 1-pentene and the like. These olefins may be used alone or in admixture thereof. Particularly preferable olefin is ethylene.

The alkyl group of the alkyl (meth)acrylate units in the copolymer is those having 1 to 10 carbon atoms, preferably 1 to 8 carbon atoms, more preferably 1 to 6 carbon atoms. If the number of carbon atoms exceeds 10, the compatibility with the component (A) is lowered and, therefore, the dispersion of the copolymer in the obtained resin composition tends to become insufficient. As a result, the effect of improving the solvent-resistance often becomes insufficient.

Examples of the alkyl (meth)acrylate are methyl acrylate, ethyl acrylate, n-propyl acrylate, i-propyl acrylate, n-butyl acrylate, t-butylacrylate, methyl methacrylate, ethyl methacrylate, n-propyl methacrylate, i-propyl methacrylate, n-butyl methacrylate, t-butyl methacrylate, and the like. These may be used alone or in admixture thereof. Particularly preferable alkyl (meth)acrylates are methyl acrylate and ethyl acrylate.

The ratio of the olefin units to the alkyl (meth)acrylate units in the copolymer is from 40/60 to 95/5 by weight, preferably 45/55 to 90/10 by weight, more preferably 50/50 to 85/15 by weight. When the weight ratio of the alkyl (meth)acrylate units in the copolymer is less than 5/95, the effect of improving the solvent-resistance tends to become insufficient. When the weight ratio of the alkyl (meth) acrylate units in the copolymer is more than 60/40, the heat stability at the time of melting (e.g. at the time of molding processing) tends to become insufficient.

Melt index (MI) value (measured under the conditions of 190° C. and 2 kg load according to JIS K 6730) of the copolymer (B) is from 0.1 to 300 g/10 minutes, preferably 0.5 to 300 g/10 minutes. When the MI value is less than 0.1 g/10 minutes, the dispersion of the copolymer in the obtained resin composition becomes insufficient. As a result, the effect of improving the solvent-resistance becomes insufficient. When the MI value is more than 300 g/10 minutes, the heat stability at the time of melting (e.g. at the time of molding processing) is insufficient.

These copolymers (B) may be used alone or in admixture thereof.

The amount of the olefin-alkyl (meth)acrylate copolymer (B) added is from 1 to 10 parts, preferably 2 to 8 parts, more preferably 2 to 7 parts, based on 100 parts of composition (A) composed of the component (A-1) and the component (A-2). When the amount of olefin-alkyl (meth)acrylate copolymer (B) is less than 1 part, the solvent-resistance improving effect is not obtained, and when exceeding 10 parts, in addition to deterioration in rigidity and heat resistance, the surface of the molded articles becomes uneven to result in bad appearance.

By forming polycarbonate resin composition (I) comprising the composition (A) comprising the polycarbonate resin (A-1) as mentioned above and the polyethylene terephthalate resin (A-2) as mentioned above, and the olefin-alkyl (meth)acrylate copolymer (B), the solvent-resistance and flow property in molding processing which are the disadvantages of the polycarbonate resin (A-1) can be improved, while keeping excellent impact resistance and heat distortion resistance that the polycarbonate resin (A-1) has, to such a level that the polycarbonate resin (A-1) can be used with omission of coating or plating which is needed to meet the demand for cost reduction in recent years, and the polycarbonate resin (A-1) is made adaptable to more complicated and larger shapes resulting from reduction of the number of component parts and uniting thee Also, when graft copolymer (C) in which at least one monomer selected from an aromatic vinyl monomer, a vinyl cyanide monomer, an acrylic acid ester, a methacrylic acid ester and other vinyl compounds copolymerizable with these monomers, which is used to improve the compatibility with a resin component, is copolymerized with a rubbery elastomer used for the purpose of relaxing external stress even at low temperatures, is further added to polycarbonate resin composition (I), the impact resistance at low temperatures can be further improved Preferably the rubbery elastomer has a glass transition temperature of not higher than 0° C., especially not higher than −40° C.

Examples of the rubbery elastomer are, for instance, a diene rubber such as polybutadiene, butadiene-acrylic acid ester copolymer or butadiene-methacrylic acid copolymer, an acrylic rubber, an ethylene-propylene rubber, a siloxane rubber, and the like. These may be used alone or in admixture thereof. Among them, polybutadiene is preferable from an economical point of view.

Examples of the aromatic vinyl monomer copolymerized with the rubbery elastomer are, for instance, styrene, o-methylstyrene, m-methylstyrene, p-methylstyrene, $\alpha$-methylstyrene, chlorostyrene, bromostyrene, vinyl toluene and the like. These may be used alone or in admixture thereof. Among them, styrene or $\alpha$-methylstyrene is preferable from the viewpoints of heat resistance and compatibility.

Examples of the above-mentioned vinyl cyanide monomer are, for instance, acrylonitrile, methacrylonitrile and the like. These may be used alone or in admixture thereof. Among them, acrylonitrile is preferable from the viewpoint of the effect of improving impact resistance.

Examples of the above-mentioned (meth)acrylic acid alkyl ester are, for instance, butyl acrylate, butyl methacrylate, ethyl acrylate, ethyl methacrylate, methyl acrylate, methyl methacrylate and the like These may be used alone or in admixture thereof. Among them, ethyl acrylate is preferable from the viewpoint of surface appearance.

Examples of the above-mentioned copolymerizable other vinyl compounds are an unsaturated acid such as acrylic acid or methacrylic acid, a (meth)acrylic acid glycidyl ester such as glycidyl acrylate or glycidyl methacrylate, vinyl acetate, maleic anhydride, N-phenylmaleimide, and the like. These may be used alone or in admixture thereof.

The ratio of the rubbery elastomer to the vinyl compound in the graft copolymer (C) is preferably from 10/90 to 90/10 by weight, especially 30/70 to 80/20 by weight. When the ratio of the rubbery elastomer is less than 10/90 or more than 90/10, there arises a case that the effect on the impact resistance at low temperatures is insufficient.

The amount of the graft copolymer (C) incorporated is from 2 to 10 parts, preferably 2 to 8 parts, more preferably 2 to 7 parts, based on 100 parts of the composition (A). When the amount of graft copolymer (C) is less than 2 parts, the effect of improving the impact resistance at low temperatures is not sufficiently obtained, and when exceeding 10 parts, the heat stability, heat resistance, rigidity and the like are deteriorated.

The polycarbonate resin compositions (I) and (II) of the present invention may be incorporated with, as occasion demands, at least one kind of various generally well-known inorganic or organic compounds such as antioxidant, heat stabilizer, lubricant, plasticizer, flame retardant, flame retarding auxiliary agent, ultraviolet absorber, pigment, antistatic agent, dispersing agent, filler, reinforcing material or other polymers, as long as these do not impair the objects of the invention.

Polycarbonate resin compositions (I) and (II) of the present invention can be produced by various methods, and there is no particular limitation in the methods. For example, after adding various additives, if necessary, into pellets or powders of polycarbonate resin (A-1), polyethylene terephthalate resin (A-2), olefin-alkyl (meth)acrylate copolymer (B) and optionally graft copolymer (C), they are melt-kneaded by a twin-screw extruder to give the composition (I) or (II). Also, if additives are liquid, the additives can be added during processing to a twin-screw extruder by means of a liquid supplying pump or the like.

Polycarbonate resin compositions (I) and (II) of the present invention have excellent solvent-resistance, heat stability, flow property in molding processing, and in the case of polycarbonate resin composition (II), it is further excellent in low temperature impact resistance. Therefore, they can be suitably used in automobile exterior parts which recently becomes a larger size, and the like.

In a preferable embodiment, the polycarbonate resin composition (I) comprises 100 parts of a composition consisting of polycarbonate resin (A-1) and polyethylene terephthalate resin (A-2) obtained by a polymerization using a germanium catalyst and having at least 80% by mole of ethylene terephthalate repeating units wherein the (A-1)/(A-2) ratio is from 99/1 to 40/60 by weight, and (B) 1 to 10 parts of an ethylene-ethyl acrylate copolymer having a melt index of 0.1 to 300 g/10 minutes measured under conditions of 190° C. and 2 kg load. This composition is preferable from the further viewpoints of moisture and heat stability and surface appearance.

In a preferable embodiment, the polycarbonate resin composition (II) comprises (A) 100 parts of a composition consisting of polycarbonate resin (A-1) and polyethylene terephthalate resin (A-2) obtained by a polymerization using a germanium catalyst and having at least 80% by mole of ethylene terephthalate repeating units wherein the ratio of (A-1)/(A-2) is from 99/1 to 40/60 by weight, (B) 1 to 10 parts of an ethylene-ethyl acrylate copolymer having a melt index of 0.1 to 300 g/10 minutes measured under conditions of 190° C. and 2 kg load, and (C) 2 to 10 parts of a graft copolymer in which at least one monomer selected from an aromatic vinyl compound, a vinyl cyanide compound, an acrylic acid ester, a methacrylic acid ester and vinyl compounds copolymerizable with them is copolymerized with a rubbery elastomer. This composition is preferable from the further viewpoints of moisture and heat stability and surface appearance.

The compositions of the present invention are more specifically explained by means of the following examples, but the present invention is not limited to these examples.

The main ingredients used in the examples and comparative examples are shown below.

Polycarbonate resin (A-1)

PC-1: Bisphenol A type polycarbonate resin having a viscosity average molecular weight of 22,000

PC-2: Bisphenol A type polycarbonate resin having a viscosity average molecular weight of 27,000

Polyethylene terephthalate resin

PET-1: Polyethylene terephthalate resin having an intrinsic viscosity of 0.55 dl/g prepared by polymerization using 0.01% of germanium dioxide catalyst based on the total acid component used in the polymerization for the polyester PET-2: Polyethylene terephthalate resin having an intrinsic viscosity of 0.85 dl/g prepared by polymerization using 0.05% of germanium dioxide catalyst based on the total acid component used in the polymerization for the polyester PET-3: Polyethylene terephthalate resin having an intrinsic viscosity of 0.60 dl/g prepared by polymerization using 0.01% of an antimony compound (antimony trioxide) catalyst based on the polyethylene terephthalate resin PET-4: Polyethylene terephthalate resin having an intrinsic viscosity of 0.60 dl/g prepared by polymerization using 0.01% of a titanium compound (potassium titanate) catalyst based on the polyethylene terephthalate resin olefin-alkyl (meth)acrylate copolymer EEA A707: EEA A707 containing 17% of ethyl acrylate unit and having an MI of 25 g/10 minutes, made by Mitsui-Du Pont Polychemical Co., Ltd.

EEA A713: EEA A713 containing 25% of ethyl acrylate unit and having an MI of 20 g/10 minutes, made by Mitsui-Du Pont Polychemical Co., Ltd.

EEA A709: ERA A709 containing 35% of ethyl acrylate unit and having an MI of 25 g/10 minutes, made by Mitsui-Du Pont Polychemical Co., Ltd.

EEA A704: EEA A704 containing 25% of ethyl acrylate unit and having an MI of 275 g/10 minutes, made by Mitsui-Du Pont Polychemical Co., Ltd.

EEA A703: EEA A703 containing 25% of ethyl acrylate unit and having an MI of 5 g/10 minutes, made by Mitsui-Du Pont Polychemical Co., Ltd.

EEA A714: EEA A714 containing 25% of ethyl acrylate unit and having an MI of 0.5 g/10 minutes, made by Mitsui-Du Pont Polychemical Co., Ltd.

EEA A715: EEA A715 containing 25% of ethyl acrylate unit having an MI of 800 g/10 minutes, made by Mitsui-Du Pont Polychemical Co., Ltd.

EEA-1: Ethylene-ethyl acrylate copolymer having an ethyl acrylate unit content of 25% and an MI of 0.05 g/10 minutes Graft copolymer (C)

Graft copolymer-1: Paraloid EXL-2602 made by Kureha Chemical Industry Co., Ltd, in which methyl methacrylate is grafted onto a rubbery elastomer (content of butadiene units 80%)

Graft copolymer-2: KaneAce BB-28 made by Kanaka Corporation, MBS resin

Graft copolymer-3: Paraloid EXL-2311 made by Kureha Chemical Industry Co., Ltd., in which methyl (meth)acrylate is grafted onto an acrylic rubber elastomer Graft copolymer-4: Methabrene W529 made by Mitsubishi Rayon Co., Ltd., in which methyl (meth)acrylate is grafted onto a styrenic rubber elastomer Graft copolymer-5: Methabrene S made by Mitsubishi Rayon Co., Ltd., silicone/acrylic graft rubber

Example 1

After previously mixing 65 parts of PC-1, 35 parts of PET-1 and 3 parts of EEA A707 which were dried sufficiently, the mixture was melt-kneaded at 280° C. by a twin-screw extruder (TEX-44S made by The Japan Steel Works, Ltd., hereinafter the same) and pelletized.

By using the obtained pellets, solvent resistance, heat stability, flow property in molding and impact resistance at low temperatures were evaluated by the following methods. The results are shown in Table 1.

(Solvent Resistance)

After drying the pellets at 120° C. for 5 hours, bar specimens of ⅛ inch thickness (width 12 mm, length 127 mm) were prepared by a 75 t injection molding machine at a cylinder temperature of 280° C. and a mold temperature of 70° C. The solvent resistance of the obtained specimens was evaluated by the following methods.

Specimen to which a 2.00% strain had been applied was coated with Wax Remover ST-7 (made by Yushiro Kabushiki Kaisha, composition: kerosene, alcohol solvent, silicone oil, non-ionic surfactant and hydrocarbon oil), and kept at 80° C. for 24 hours. The change in appearance of the specimen was visually observed and evaluated according to the following criteria.

Also, specimen to which a 1.00% strain had been applied was coated with Wax Remover ST-210 (made by Yushiro kabushiki Kaisha, composition: monoethanolamine, polyethylene glycol, propylene glycol monobutyl ether, ethylenediamine tetraacetate, anionic surfactant and potassium hydroxide, pH 13.7), and kept at 23° C. for 24 hours. The change in appearance of the specimen was visually observed and evaluated according to the following criteria.

○: No change in appearance x: Generation of cracks (Heat Stability)

After drying the pellets at 120° C. for 5 hours, molded articles [outer frame component of door handle of automobile, shape: about 160×80×60 mm, average wall thickness 3.5 mm (the schema is shown in FIG. 1, wherein 1 is an outer frame component of door handle of automobile, and 2 is a sprue)] were molded by a 35 t injection molding machine at a cylinder temperature of 300° C., an injection pressure of 98 MPa and a mold temperature of 70° C., while increasing the cooling time stepwise by 10 seconds per every 20 shots from 20 seconds. The appearance of the obtained molded articles were visually observed, and the longest cooling time which did not generate appearance failure such as flash or silver streak was evaluated as the limit molding cycle (second). The limit molding cycle indicates that the larger the value, the better the heat stability.

(Flow Property In Molding)

After drying the pellets at 120° C. for 5 hours, molding operation was carried out at a cylinder temperature of 280° C., an injection pressure of 98 MPa and a mold temperature of 70° C. by using a 150 t injection molding machine and a spiral mold having a dimension of 4×4 mm in gate, 10 mm in width and 3 mm in thickness. The flow length (mm) was evaluated.

(Low Temperature Impact Resistance)

After drying the pellets at 120° C. for 5 hours, ⅛ inch thick bar specimens (width 12.7 mm, length 127 mm) were prepared by a 75 t injection molding machine at a cylinder temperature of 280° C., an injection pressure of 98 MPa and a mold temperature of 70° C. Izod impact strength (J/m) of the obtained specimens were measured at −30° C. according to ASTM D-256.

Example 2

A mixture of 65 parts of PC-2, 35 parts of PET-1 and 4 parts of EEA A713 was pelletized and evaluated in the same manner as in Example 1. The results are shown in Table 1.

Example 3

A mixture of 85 parts of PC-2, 15 parts of PET-1 and 7 parts of EEA A709 was pelletized and evaluated in the same manner as in Example 1. The results are shown in Table 1.

Example 4

A mixture of 65 parts of PC-1, 35 parts of PET-2 and 5 parts of EEA A704 was pelletized and evaluated in the same manner as in Example 1. The results are shown in Table 1.

Example 5

A mixture of 70 parts of PC-1, 30 parts of PET-2 and 5 parts of EEA A703 was pelletized and evaluated in the same manner as in Example 1. The results are shown in Table 1.

Example 6

A mixture of 70 parts of PC-1, 30 parts of PET-2 and 5 parts of EEA A714 was pelletized and evaluated in the same manner as in Example 1. The results are shown in Table 1.

Example 7

A mixture of 65 parts of PC-2, 35 parts of PET-1, 4 parts of EEA A713 and 6 parts of graft copolymer-1 was pelletized and evaluated in the same manner as in Example 1. The results are shown in Table 1.

Example 8

A mixture of 75 parts of PC-2, 25 parts of PET-2, 3 parts of EEA A709 and 5 parts of graft copolymer-2 was pelletized and evaluated in the same manner as in Example 1. The results are shown in Table 1.

Example 9

A mixture of 75 parts of PC-2, 25 parts of PET-2, 3 parts of EEA A709 and 4 parts of graft copolymer-3 was pelletized and evaluated in the same manner as in Example 1. The results are shown in Table 1.

Example 10

A mixture of 70 parts of PC-2, 30 parts of PET-2, 3 parts of EEA A713 and 5 parts of graft copolymer-4 was pelletized and evaluated in the same manner as in Example 1. The results are shown in Table 1.

Example 11

A mixture of 80 parts of PC-2, 20 parts of PET-2, 5 parts of EEA A713 and 7 parts of graft copolymer-5 was pelletized and evaluated in the same manner as in Example 1. The results are shown in Table 1.

Comparative Example 1

A mixture of 70 parts of PC-1, 30 parts of PET-1 and 5 parts of EEA-1 was pelletized and evaluated in the same manner as in Example 1. The results are shown in Table 2.

Comparative Example 2

A mixture of 70 parts of PC-1, 30 parts of PET-1 and 5 parts of EEA A715 was pelletized and evaluated in the same manner as in Example 1. The results are shown in Table 2.

TABLE 1

| Example Number | 1 | 2 | 3 | 4 | 5 | 6 | 7 | 8 | 9 | 10 | 11 |
|---|---|---|---|---|---|---|---|---|---|---|---|
| Composition (part) | | | | | | | | | | | |
| PC-1 | 65 | — | — | 65 | 70 | 70 | — | — | — | — | — |
| PC-2 | — | 65 | 85 | — | — | — | 65 | 75 | 75 | 70 | 80 |
| PET-1 | 35 | 35 | 15 | — | — | — | 35 | — | — | — | — |
| PET-2 | — | — | — | 35 | 30 | 30 | — | 25 | 25 | 30 | 20 |
| EEA A707 | 3 | — | — | — | — | — | — | — | — | — | — |
| EEA A713 | — | 4 | — | — | — | — | 4 | — | — | 3 | 5 |
| EEA A709 | — | — | 7 | — | — | — | — | 3. | 3 | — | — |
| EEA A704 | — | — | — | 5 | — | — | — | — | — | — | — |
| EEA A703 | — | — | — | — | 5 | — | — | — | — | — | — |
| EEA A714 | — | — | — | — | — | 5 | — | — | — | — | — |
| Graft Copolymer-1 | — | — | — | — | — | — | 6 | — | — | — | — |
| Graft Copolymer-2 | — | — | — | — | — | — | — | 5 | — | — | — |
| Graft Copolymer-3 | — | — | — | — | — | — | — | — | 4 | — | — |
| Graft Copolymer-4 | — | — | — | — | — | — | — | — | — | 5 | — |
| Graft Copolymer-5 | — | — | — | — | — | — | — | — | — | — | 7 |
| Solvent resistance | | | | | | | | | | | |
| ST-7 (2.00% strain) | ◯ | ◯ | ◯ | ◯ | ◯ | ◯ | ◯ | ◯ | ◯ | ◯ | ◯ |
| ST-210 (1.00% strain) | ◯ | ◯ | ◯ | ◯ | ◯ | ◯ | ◯ | ◯ | ◯ | ◯ | ◯ |
| Heat stability (second) | 170 | 170 | 180 | 180 | 190 | 190 | 160 | 160 | 180 | 180 | 170 |
| Flow property in. molding (mm) | 680 | 640 | 675 | 610 | 600 | 615 | 630 | 600 | 620 | 630 | 600 |
| Low temperature impact resistance (−30° C.)(J/m) | 50 | 80 | 120 | 80 | 80 | 70 | 450 | 505 | 435 | 450 | 610 |

Comparative Example 3

A mixture of 70 parts of PC-1, 30 parts of PET-1 and 5 parts of a linear low density polyethylene having an MI of 40 g/10 minutes (5034G made by Idemitsu Oil Chemical Co., Ltd., hereinafter referred to as "LLDPE") was pelletized and evaluated in the same manner as in Example 1. The results are shown in Table 2.

Comparative Example 4

A mixture of 70 parts of PC-1, 30 parts of PET-1 and 0.5 part of EEA A713 was pelletized and evaluated in the same manner as in Example 1. The results are shown in Table 2.

Comparative Example 5

A mixture of 70 parts of PC-1, 30 parts of PET-1 and 20 parts of EEA A713 was pelletized and evaluated in the same manner as in Example 1. The results are shown in Table 2.

Comparative Example 6

A mixture of 70 parts of PC-1, 30 parts of PET-3 and 5 parts of EEA A713 was pelletized and evaluated in the same manner as in Example 1. The results are shown in Table 2.

Comparative Example 7

A mixture of 70 parts of PC-1, 30 parts of PET-4 and 5 parts of EEA A713 was pelletized and evaluated in the same manner as in Example 1. The results are shown in Table 2.

TABLE 2

| Comparative Example Number | 1 | 2 | 3 | 4 | 5 | 6 | 7 |
|---|---|---|---|---|---|---|---|
| Composition (part) | | | | | | | |
| PC-1 | 70 | 70 | 70 | 70 | 70 | 70 | 70 |
| PET-1 | 30 | 30 | 30 | 30 | 30 | — | — |
| PET-3 (Sb catalyst) | — | — | — | — | — | 30 | — |
| PET-4 (Ti catalyst) | — | — | — | — | — | — | 30 |
| EEA A713 | — | — | — | 0.5 | 20 | 5 | 5 |
| EEA-1 | 5 | — | — | — | — | — | — |
| EEA A715 | — | 5 | — | — | — | — | — |
| LLDPE | — | — | 5 | — | — | — | — |
| Solvent resistance | | | | | | | |
| ST-7 (2.00% strain) | x | x | x | x | ◯ | x | x |
| ST-210 (1.00% strain) | x | x | x | x | ◯ | x | x |
| Heat stability (second) | 170 | 90 | 180 | 180 | 80 | 90 | 100 |
| Flow property in molding (mm) | 600 | 680 | 575 | 610 | 690 | 635 | 620 |
| Low temperature impact resistance (−30° C.) (J/m) | 70 | 70 | 50 | 50 | 110 | 90 | 90 |

The following would be apparent from the Examples and Comparative Examples.

The resin compositions of the present invention (Examples 1 to 11) have excellent solvent resistance, heat stability and flow property in molding. Also, the resin compositions using the graft copolymer (C) (Examples 7 to 11) have an excellent impact resistance at low temperature as well.

On the other hand, when the ethylene-ethyl acrylate copolymer has an MI of less than 0.1 g/10 minutes (Comparative Example 1), the solvent resistance is poor, and when having an MI of more than 300 g/10 minutes (Comparative Example 2), the solvent resistance and heat stability are poor.

Even if the MI of a polyolefin is more than 0.1 g/10 minutes, the resin composition using LLDPE instead of the polyolefin-alkyl (meth)acrylate copolymer (Comparative Example 3) is poor in solvent resistance.

When the amount of the ethylene-ethyl acrylate copolymer is less than 1 part (Comparative Example 4), the solvent resistance is poor, and when exceeding 10 parts (Comparative Example 5), the heat stability is poor.

The resin compositions using an antimony compound or titanium compound as a catalyst for producing polyethylene terephthalate resin (Comparative Examples 6 and 7) are poor in solvent resistance and heat stability.

According to the present invention, resin compositions which can meet the demand of high solvent resistance and which have excellent heat stability and flow property in molding are obtained, and are also industrially useful.

INDUSTRIAL APPLICABILITY

The polycarbonate resin compositions (i) and (II) of the present invention have excellent solvent resistance, heat stability and flow property in molding, and the polycarbonate resin composition (ii) has an excellent impact resistance at low temperature as well. Therefore, these compositions are suitably used for automobile exterior parts which becomes larger size recently.

We claim:

1. A polycarbonate resin composition comprising:

(A) a composition comprising a polycarbonate resin (A-1) and a polyethylene terephthalate resin (A-2) having not less than 80% by mole of ethylene terephthalate repeating units polymerized by using a germanium catalyst wherein the weight ratio of (A-1)/(A-2) is from 99/1 to 40/60, and (B) 1 to 10 parts by weight, per 100 parts by weight of said composition (A), of a copolymer having units of at least one olefin and units of at least one alkyl (meth) acrylate with an alkyl group having 1 to 10 carbon atoms, which has a melt index (MI) value of 0.1 to 300 g/10 minutes under conditions of 190° C. and 2 kg load.

2. A polycarbonate resin composition comprising:

(A) a composition comprising a polycarbonate resin (A-1) and a polyethylene terephthalate resin (A-2) having not less than 80% by mole of ethylene terephthalate repeating units polymerized by using a germanium catalyst wherein the weight ratio of (A-1)/(A-2) is from 99/1 to 40/60, (B) 1 to 10 parts by weight, per 100 parts by weight of said composition (A), of a copolymer having units of at least one olefin and units of at least one alkyl (meth) acrylate with an alkyl group having 1 to 10 carbon atoms, which has a melt index (MI) value of 0.1 to 300 g/10 minutes under conditions of 190° C. and 2 kg load, and (C) 2 to 10 parts by weight, per 100 parts by weight of said composition (A), of a graft copolymer in which at least one monomer selected from the group consisting of an aromatic vinyl comopund, a vinyl cyanide compound, an acrylic acid ester, a methacrylic acid ester and vinyl compounds copolymerizable with them is copolymerized with a rubbery elastomer.

* * * * *